US009357183B2

(12) United States Patent
Cordero

(10) Patent No.: US 9,357,183 B2
(45) Date of Patent: May 31, 2016

(54) METHOD AND SYSTEM FOR LIGHT-BASED INTERVENTION

(75) Inventor: Jose Cordero, Livingston, NJ (US)

(73) Assignee: THE CORDERO GROUP, Lyndhurst, NJ (US)

( * ) Notice: Subject to any disclaimer, the term of this patent is extended or adjusted under 35 U.S.C. 154(b) by 331 days.

(21) Appl. No.: 13/050,311

(22) Filed: Mar. 17, 2011

(65) Prior Publication Data

US 2011/0228086 A1 Sep. 22, 2011

Related U.S. Application Data

(60) Provisional application No. 61/314,896, filed on Mar. 17, 2010.

(51) Int. Cl.
*H04N 7/18* (2006.01)
*G08B 13/196* (2006.01)

(52) U.S. Cl.
CPC .......... *H04N 7/185* (2013.01); *G08B 13/19636* (2013.01); *G08B 13/19689* (2013.01)

(58) Field of Classification Search
USPC ................ 348/143, 140, 142, 152, 154–155; 342/62
See application file for complete search history.

(56) References Cited

U.S. PATENT DOCUMENTS

| | | | |
|---|---|---|---|
| 6,819,239 B2 | 11/2004 | Bingham | |
| 7,327,253 B2 | 2/2008 | Whitten et al. | |
| 2002/0080999 A1* | 6/2002 | Bani-Hashemi et al. | 382/103 |
| 2002/0093666 A1* | 7/2002 | Foote et al. | 356/621 |
| 2005/0128291 A1* | 6/2005 | Murakami | 348/143 |
| 2006/0203090 A1* | 9/2006 | Wang et al. | 348/143 |
| 2006/0238617 A1* | 10/2006 | Tamir | 348/143 |
| 2007/0268685 A1* | 11/2007 | Fossier et al. | 362/135 |
| 2008/0007400 A1* | 1/2008 | Murphy | 340/540 |
| 2008/0062255 A1* | 3/2008 | Gal | 348/37 |
| 2008/0186720 A1* | 8/2008 | Verbrugh | 362/383 |
| 2008/0266393 A1* | 10/2008 | Park | 348/143 |
| 2009/0116210 A1* | 5/2009 | Cutler et al. | 362/8 |
| 2009/0262189 A1* | 10/2009 | Marman | 348/143 |

(Continued)

OTHER PUBLICATIONS

PCT International Searching Authority, Notification of Transmittal of the International Search Report and the Written Opinion of the International Searching Authority, or the Declaration, in Application No. PCT/US2011/028830, dated May 19, 2011 (total 11 pages).

(Continued)

*Primary Examiner* — Christopher S Kelley
*Assistant Examiner* — Ana Picon-Feliciano
(74) *Attorney, Agent, or Firm* — Arent Fox LLP

(57) ABSTRACT

A method and system are provided in which a device having one or more illumination sources and may receive information for a target location through a network connection. The information may be based on video captured by a surveillance camera. The device may adjust a projection position of one of the illumination sources based on the target location information and may project a light beam generated by the illumination source onto the target location when the projection position is adjusted. The light beam may project a pattern onto the target location, which may comprise an image, a letter, a word, a symbol, or a combination thereof. The device may receive an indication of a type of situation taking place at the target location and may utilize the indication to select an illumination source and/or a type of pattern to project onto the target location.

25 Claims, 15 Drawing Sheets

(56) References Cited

U.S. PATENT DOCUMENTS

| | | | |
|---|---|---|---|
| 2009/0268023 A1* | 10/2009 | Hsieh | 348/143 |
| 2010/0013917 A1* | 1/2010 | Hanna et al. | 348/143 |
| 2010/0020078 A1* | 1/2010 | Shpunt | 345/420 |
| 2010/0097468 A1* | 4/2010 | Mayer et al. | 348/148 |

OTHER PUBLICATIONS

PCT, the International Bureau of WIPO, International Preliminary Report on Patentability attaching Written Opinion, in International Application No. PCT/US2011/028830, dated Sep. 18, 2012.

* cited by examiner

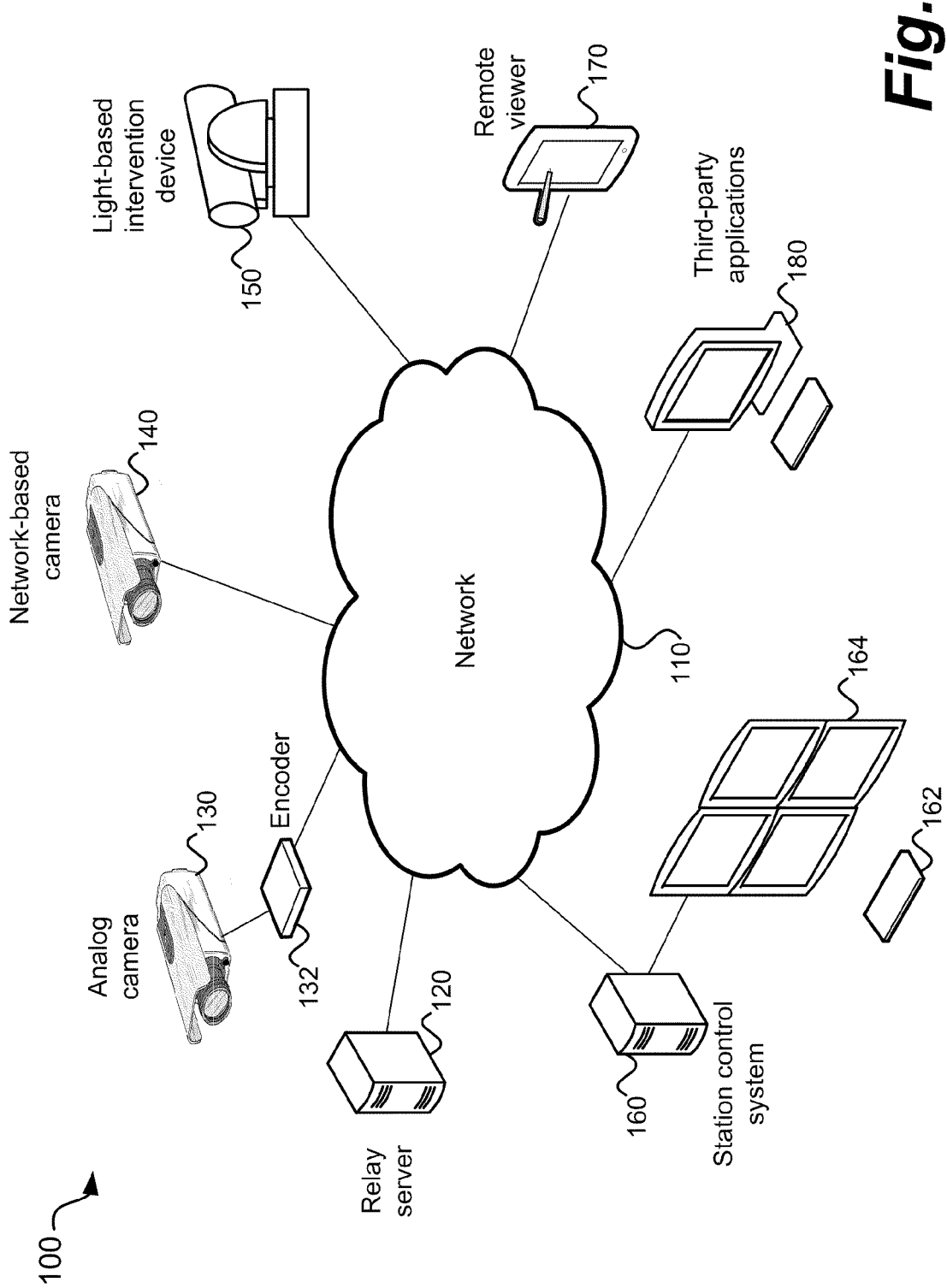

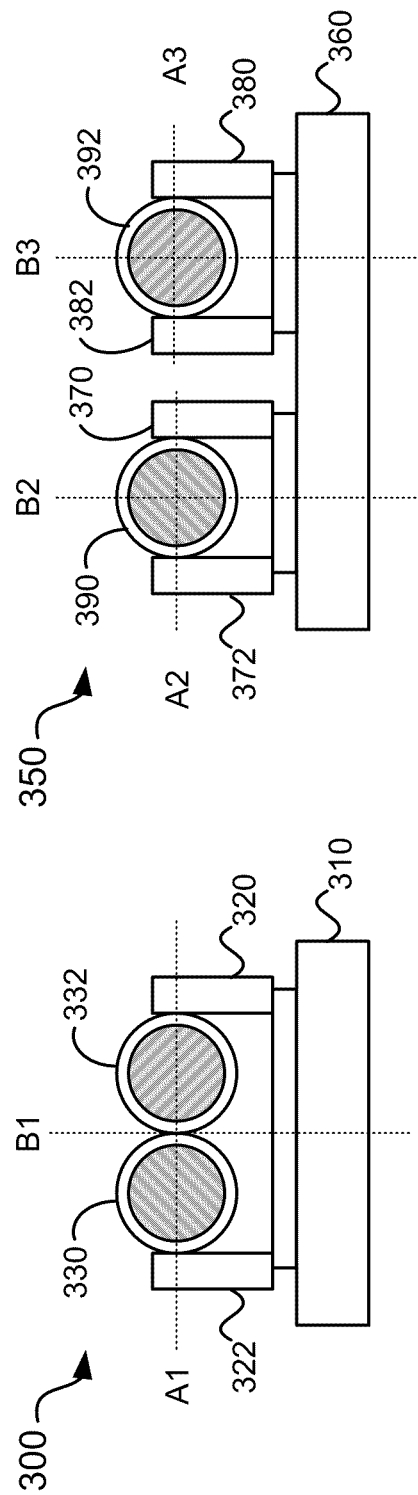

METHOD AND SYSTEM FOR LIGHT-BASED INTERVENTION

CROSS-REFERENCE TO RELATED APPLICATIONS/INCORPORATION BY REFERENCE

This application claims priority to and makes reference to U.S. Provisional Patent Application Ser. No. 61/314,896 filed on Mar. 17, 2010.

The above stated application is hereby incorporated herein by reference in its entirety.

FIELD OF TECHNOLOGY

Certain embodiments of the disclosure relate to security and surveillance applications. More specifically, certain embodiments of the disclosure relate to a method and system for light-based intervention.

BACKGROUND

The use of Closed-Circuit Television (CCTV) systems has grown significantly in recent years. One of the most often cited benefits for the adoption of CCTV systems is crime prevention. Proponents of public CCTV systems often cite two environmental criminological theories—situational crime prevention and routine activities—as the basis of their crime prevention effectiveness. From a situational crime prevention standpoint, these systems are said to increase the opportunity cost of committing a crime by increasing the perceived risks of detection and apprehension. Routine activities proponents advocate that CCTV systems are capable guardians that may be used to disrupt the commission of crime.

While situational crime prevention and routine activities theories are the basis of several crime prevention strategies that are currently employed by progressive police departments, the findings of a growing number of research studies on the impact of CCTV systems on crime leaves much to be desired from these systems.

The difference in the effectiveness of the above-described theories lies in the approach used by law enforcement personnel to influence the criminal mindset about the likely negative consequences of committing crimes. For example, the physical presence of the police on the street tends to project a high risk of immediate detection and intervention. Likewise, police patrols produce a high level of guardianship. CCTV systems, on the other hand, tend to be less visible and are perceived to be less capable of immediate intervention, thus diminishing their capacity to prevent crime. Therefore, there is a need to improve on the effectiveness of CCTV systems by increasing their deterrence factor such that the criminal mindset can be influenced on the spot.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A system and/or method is provided for light-based intervention, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 1 is a diagram that illustrates an example of a surveillance system for light-based intervention, in accordance with an embodiment of the disclosure.

FIGS. 3A and 3B are diagrams that illustrate examples of different light-based intervention devices with multiple illumination sources, in accordance with embodiments of the disclosure.

DETAILED DESCRIPTION OF THE DISCLOSURE

Figure 2B:
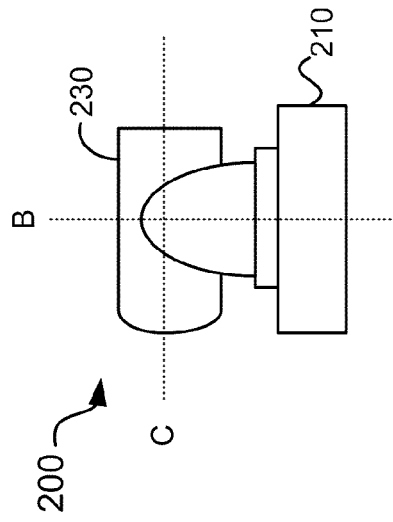
FIGS. 2A-2C are diagrams that illustrate examples of different views of a light-based intervention device, in accordance with embodiments of the disclosure.

Certain embodiments of the disclosure may be found in a method and system for light-based intervention. Various embodiments of the disclosure provide for a device that may comprise one or more illumination sources and that may receive information for a target location through a network connection, where the information may be based on video captured by a surveillance camera. The device may adjust a projection position of one of the illumination sources based on the target location information and may project a light beam generated by the illumination source onto the target location when the projection position is adjusted. The light beam may project a pattern onto the target location, where such pattern may comprise an image, a letter, a word, a symbol, or a combination thereof. The device may receive an indication of a type of situation taking place at the target location and may utilize the indication to select an illumination source with which to project a light beam onto the target location and/or a type of pattern to project onto the target location.

Another embodiment of the disclosure may provide for a device that comprises an illumination source and that is operable to receive, through a network connection, information for one or more target locations based on video captured by a surveillance camera. The device may also receive a projection schedule and may adjust a projection position of the illumination source based on the received projection schedule. The device may then project a light beam generated by the illumination source onto one of multiple target locations. While in operation, the device may receive a new projection schedule through the network connection and may subsequently operate in accordance with the new projection schedule.

FIG. 1 is a diagram that illustrates an example of a surveillance system for light-based intervention, in accordance with an embodiment of the disclosure. Referring to FIG. 1, there is shown a surveillance system 100 for use in crime prevention or other similar security application in which light-based intervention can provide deterrence from illegal or criminal activity. Such deterrence may result from potential offenders being alerted of the presence of surveillance in the area and that there is active monitoring of their actions.

The surveillance system 100 may comprise a network 110, a relay server 120, one or more analog cameras 120, one or more network-based cameras 140, one or more light-based intervention (LBI) devices 150, and a station control system 160. In some embodiments, the surveillance system 100 may also include one or more remote viewers 170. These viewers are typically authorized personnel that is remotely located, such as police officers, law enforcement personnel, and/or providers of security services, for example, that may require access to the operations and/or information of the surveillance system 100. Moreover, the surveillance system 100 may enable one or more third-party service applications 180 to receive live video feeds and/or stored video content captured by the cameras in the surveillance system 100.

The network 110 may be an Internet Protocol (IP) network through which data and/or control information may be communicated between devices in the surveillance system 100. The exchange of data and/or control information may be performed using a communication protocol such as Transmission Control Protocol/IP (TCP/IP) and/or related protocols, for example. The various devices may be identified in the network 110 by a particular IP address. For any one device, an IP address may identify the type of device it is, where it is logically and/or physically located in the network 110, and/or the manner to access the device through the network 110.

The network 110 may be a local area network (LAN), a wide area network (WAN), a virtual private network (VPN), a wireless network, the internet, or a combination thereof, for example. In this regard, when the network 110 comprises more than one network topology, architecture, and/or access technology, the network 110 may have the appropriate hardware, software, and/or interfaces to enable communication of data and/or control information across the various portions of the network.

The analog camera 130 may be used to capture video content, which in some instances may comprise an audio component as well. The analog output from the analog camera 130 may be digitized and/or formatted by the encoder 132 before it may be handled by the network 110. The encoder 132 may also allow control information from the network 110 to be properly converted and/or formatted to control the operations and/or functions of the analog camera 130. The encoder 132 may have an IP address that serves as a proxy for network access to the analog camera 130.

The network-based camera 140 may be used to capture video content, which in some instances may comprise an audio component as well. The network-based camera 140 may be operable to communicate with the network 110 directly, that is, without the need of another device. In this regard, each network-based camera 140 may have its own IP address for network identification.

While some of the cameras in the surveillance system 100 may have a fixed capture position, others may be equipped to perform horizontal movements (panning) and/or vertical movements (tilting) in order to position the field of view (FOB) of the camera in an area of interest. Regardless of whether a camera in the surveillance system 100 has a fixed or an adjustable capture position, a camera may have zooming capabilities that allows it to adjust its angle of view. The amount of pan, tilt, and/or zoom that is to be applied to a camera may be adjusted by providing control information through the network 110. Another aspect of camera operation that may be controlled in this manner is the speed with which panning, tilting, and/or zooming takes place.

A network-based camera 140 may be a smart camera, also referred to as a smart sensor. A smart camera may be operable to perform various types of image analysis operations on the content of the video being captured. For example, a smart camera may perform object detection, recognition, and/or classification, people tracking, and/or behavioral pattern recognition. The smart camera may also be operable to process the results from the image analysis operations to provide model-based control information to one or more devices through the network 110.

The type of image analysis operations described above may be referred to as video analytics. Some or all of the video analytic operations may be performed at the capture end, that is, at a smart camera or smart sensor. In other instances, some or all of the video analytic operations may be performed at the back-end, which may occur at the relay server 120 and/or at the station control system 160.

The various cameras in the surveillance system 100 may be positioned at different locations in the geographical region that is covered by the system. Accordingly, the geographical position of each camera may be known. For example, for local area deployments, a geographical information system (GIS) may be utilized to provide position information for cameras in the surveillance system 100. In another example, when a wide-area large scale deployment is used, the Global Positioning System (GPS) may be a source of the exact location of a camera in the surveillance system 100.

The relay server 120 may comprise suitable hardware and/or software to provide control and/or management operations for the cameras and/or the LBI devices 150 in the surveillance system 100. While the relay server 120 can manage a certain number of devices, the surveillance system 100 may be scalable by simply adding more relay servers 120 to handle additional cameras and/or LBI devices 150.

The relay server 120 may be operable to allow an administrator and/or operator of the surveillance system 100 to configure the operations of the cameras and/or the LBI devices 150 through the network 110. The relay server 120 may also be utilized to manage and/or define system-wide attributes, such as IP addresses, video storage allocation, and video transmission properties. Once the system has been configured, the relay server 120 may be utilized to generate preset camera and/or LBI device positions, including pan, tilt, and/or zoom properties, for example. The relay server 120 may also be operable to provide a schedule of device positions and/or operations for the cameras and/or the LBI devices in the surveillance system 100. The schedule provided may comprise timing information as well as positioning information (e.g., pan, tilt, zoom).

The relay server 120 may be operable to enable the remote viewer 170 to access a live video feed and/or stored video content through a cellular phone, a laptop, a desktop computer, and/or a tablet device.

In some instances, video content may be store locally in a camera. However, the relay server 120 and/or other devices (not shown) may typically handle video storage. An example of a device or system that may be utilized with the relay server 120 to store video captured by the cameras in the surveillance system 100 is a Network-Attached Storage (NAS) device. The relay server 120 may continue to manage storage operations even when portions of the video content are stored in another device.

The relay server 120 may provide Application Program Interfaces (APIs) and/or ActiveX controls to allow the third-party application 180 to access video content from the surveillance system 100. An example of such an application is a Supervisory Control And Data Acquisition (SCADA) that may be utilized to control various processes and/or operations associated with the surveillance system 100.

The station control system 160 may comprise suitable hardware, software, and/or interfaces that may be operable to provide a user interface that enables a system administrator and/or an operator to control the functions and/or operations of the surveillance system 100. For example, a browser-like interface may be utilized to visually present in a display 164 live video being captured by the cameras in the surveillance system 100. Moreover, the browser-like interface may also present and/or enable access to information regarding stored video content, alarms or notices, and/or overall system performance and capabilities.

With respect to alarms, the surveillance system 100 comprise an alarm server software application that may reside in, for example, the relay server 120 and/or the station control system 160. The alarm server software may enable receiving, parsing, managing, and acting upon various alarms and/or alarm types received. The alarm server software may also enable creating alarms, processing alarms related to cameras moving from preset positions, storing alarm information in a database for later retrieval. Moreover, the alarm server software may enable users to configure a wide range of alarm responses to address different types of alarms.

The controller 162 may be utilized by a system administrator and/or operator to interact with the browser-like interface to support and/or manage the various functions of the surveillance system 100. For example, the controller 162 may enable a user to point and click to certain portions of the user interface to activate certain operations associated with one or more of the devices in the surveillance system 100.

The LBI device 150 may be operable to project a light beam or other like light-based indication to a particular target location after being instructed to do so by control information provided through the network 110. The LBI device 150 may produce a light beam having different characteristics in accordance with the type of event or situation that prompted the need for intervention. For example, a light beam generated to prevent or stop an illegal or criminal act may be different from a light beam generated to indicate to an injured person or someone in a desolate area that law enforcement is monitoring the area and assistance is on its way or readily available.

The LBI device 150 may produce a steady light beam, light beam with different temporal patterns (e.g., pulsating light beam), light beams of different colors, light beams with different spot sizes, and/or light beams that project different spatial patterns (e.g., images, shapes, letters, words, symbols). The LBI device 150 may comprise one or more illumination sources, each of which may have different characteristics than the others and/or may be used to project different information onto a target location. In this regard, the LBI device 150 may select an illumination source that is appropriate for the type of intervention that is needed in a particular situation.

The LBI device 150 may also reproduce audible signals or sounds such as alarms, tones, and/or speech, for example, which may be generated concurrently with the light beam. As with the characteristics of the light beam, the type of audible signals reproduced may be based on the type of event or situation that prompted the need for intervention. For example, various tones, sound patterns, and/or messages may be reproduced by the LBI device 150 in accordance with the type of intervention that is needed.

The LBI device 150 may receive location information of the target onto which the light beam is to be projected. The location information may be generated from video content captured by one of the cameras in the surveillance system 100. In one embodiment, an operator or user of the station control system 160 may observe or detect that a criminal act is about to be committed or is in progress from a live video feed being presented in the display 164. The operator may, among other actions, interact with the user interface to obtain the coordinates of the location where the activity is taking place. The coordinates, which may include an estimate of the distance between the camera and the location of the activity, may be communicated to the relay server 120 for processing and to generate the location information that is to be communicated to the appropriate LBI device 150. Along with the location information, there may be an indication of the type of activity that is taking place and, therefore, of the type of intervention that is needed from the LBI device 150.

In another embodiment, a smart camera in the surveillance system 100 may detect that an illegal or criminal act is about to be committed or is in progress based on video analytics operations. The smart camera may be operable to obtain the coordinates of the location of the activity, which may include an estimate of the distance between the camera and the location of the activity. From the coordinates obtained, the smart camera may generate location information that may be sent to the appropriate LBI device 150 through the network 110, typically through the relay server 120. Because of the geographic nature of the surveillance system 100, the smart camera may be aware of one or more LBI devices 150 that may operate in its vicinity and that may be able to project an intervention signal onto the area where the activity was detected.

Another approach is for the smart camera to send the coordinates of the location of interest to the relay server 120 for processing and to generate the location information that is to be communicated to the appropriate LBI device 150. Which approach is followed may be based on the capabilities of the smart camera and/or on the configuration of the surveillance system 100. In either case, an indication may be generated of the type of activity that is taking place and, therefore, of the type of intervention that is needed from the LBI device 150. Such indication may be generated by the smart camera or by the relay server 120.

Once the LBI device 150 receives the location information, the projection position of the device may be adjusted and a light beam may be generated and projected onto the target location. When the light-based intervention was prompted by an illegal or criminal act, "painting" the offenders with the light beam makes them aware that they are being observed, that video footage of the event may be available, and/or that law enforcement or security personnel are responding to the scene, effectively intervening and disrupting the illegal or criminal act.

The cameras and the LBI devices 150 in the surveillance system 100 may be configured to have a set number of preset capture positions and projection positions, respectively. When a particular camera or LBI device 150 moves from a preset position, an alarm may be generated to report the change. When an LBI device 150 receives target location information to initiate a light-based intervention, the information received may instruct the LBI device 150 to use one of the preset projection positions. In some embodiments, the target location information provided to the LBI device 150 may override the preset projection positions and may require the LBI device 150 to adjust its projection position according to the information received.

Figure 2A:
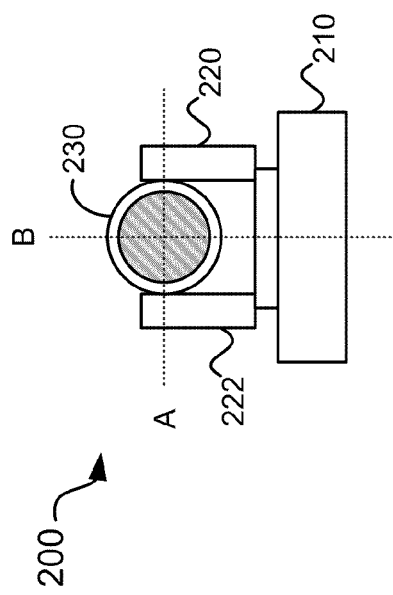
Figure 2C:
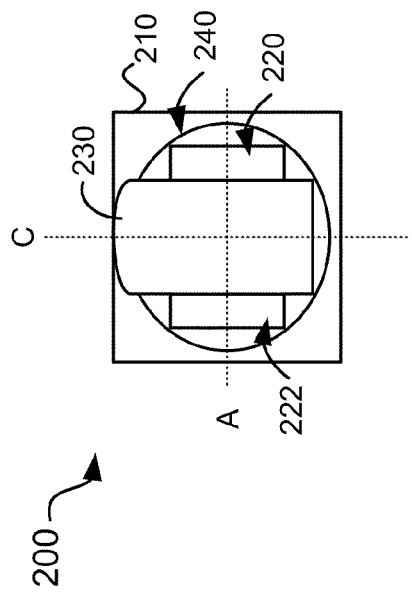

FIGS. 2A-2C are diagrams that illustrate examples of different views of a light-based intervention device, in accordance with embodiments of the disclosure. Referring to FIG. 2A, there is shown a front view of an LBI device 200 that may comprise a base 210, forked arms 220 and 222, and an illumination source 230. The housing material from which the base 210, the forked arms 220 and 222, and the illumination source 230 are made may be a weatherproof material. The material may be one that is consistent with an Ingress Protection (IP) rating of 56 or a National Electrical Manufacturers Association (NEMA) rating of 4.

As illustrated in FIG. 2A, the forked arms 220 and 222 may be rotatably coupled to the base 210. Thus, the forked arms 220 and 222 may pan or swing horizontally about an axis B. The illumination source 230 may be pivotally coupled to the forked arms 220 and 222. Thus, the illumination source 230 may tilt or swing vertically about an axis A.

In addition to processing, control, interface, and power regulation circuitry, the base 210 may comprise motors, such as step motors and/or servo motors, for example, to enable panning and/or tilting. In some instances, the motors utilized for tilting may be inside one or both of the forked arms 220 and 222. Typically, however, the forked arms 220 and 222 may have gears and/or some other mechanical device that may be driven by the motor or motors in the base 210 to provide the tilting of the illumination source 230.

The illumination source 230 may comprise a source of light (not shown). In one embodiment, the source of light may be halogen light that may be capable of high-power, long-range operation. For example, the halogen light may produce a light beam of up to 2000 feet on 100 Watts of power and 12 Volts of operating voltage, with a typical range being approximately 200 meters and a horizontal beam width or spot size of 20 meters at that range. Other sources of light may include, but need not be limited to, arc lamps or other like lamps.

The illumination source 230 may also comprise an optical assembly (not shown). The optical assembly may comprise a shutter, a dimmer, one or more lenses, one or more irises, pattern wheels or gate shutters to change the shape of the beam or project images, and/or automated train lenses for zooming and/or focusing the beam.

Referring to FIGS. 2B and 2C, there are shown side and top views of the LBI device 200, respectively. Each of these views shows a longitudinal axis C along the length of the illumination source 230. The direction of the longitudinal axis C may correspond to the direction or projection position of the illumination source 230. Thus, when the forked arms 220 and 222 rotate about the axis B during panning in response to location information received by the LBI device 200, the longitudinal axis C also rotates about the axis B. Similarly, when the illumination source 230 pivots about the axis A during tilting in response to location information received by the LBI device 200, the longitudinal axis C also pivots about the axis A. Also shown in FIG. 2C is a turntable 240 on top of which the forked arms 220 and 222 may rest. The turntable 240 may provide the panning or rotation about the axis B.

While the LBI device 200 has been shown as a stand alone device, the disclosure need not be so limited. The LBI device 200 may be integrated with and/or attached to a camera in the surveillance system 100. For example, the LBI device 200 may be integrated and/or attached to an analog camera 130 or to a network-based camera 140. In such instances, the intervention provided by the LBI device 200 may be associated with an activity detected from video content captured by the camera that is integrated with and/or attached to the LBI device 200.

FIGS. 3A and 3B are diagrams that illustrate examples of different light-based intervention devices with multiple illumination sources, in accordance with embodiments of the disclosure. Referring to FIG. 3A, there is shown a front view of an LBI device 300 that may comprise a base 310, forked arms 320 and 322, and illumination sources 330 and 332. The housing material from which the base 310, the forked arms 320 and 322, and the illumination sources 330 and 332 are made may be a weatherproof material like the one described above for the LBI device 200.

The base 310 and the forked arms 320 and 322 may be substantially similar to the base 210 and the forked arms 220 and 222 described above, respectively. Each of the illumination sources 330 and 332 may be substantially similar to the illumination source 230 also described above. However, some of the characteristics associated with the illumination source 330 may be different from those of the illumination source 332. For example, the two illumination sources may have different sources of light, may produce different temporal patterns (e.g., pulsating light beam), may have different colors, may produce light beams with different spot sizes, and/or may project different spatial patterns (e.g., images, shapes, letters, words, symbols). Accordingly, the LBI device 300 may select one or both illumination sources based on their characteristics to project a light beam onto a target location that is in accordance with the type of activity that is taking place at that location. For example, when an illegal or criminal act may be taking place, the illumination source 330 may be utilized to project a pulsating light beam onto the target location while the illumination source 332 may be utilized to project the word "POLICE" onto the same target location. In another example, only the illumination source 332 may be utilized to project the word "POLICE" onto the target location.

As illustrated in FIG. 3A, the forked arms 320 and 322, which are rotatably coupled to the base 310, may pan or swing horizontally about an axis B1. The illumination sources 330 and 332, which are coupled together and pivotally coupled to the forked arms 320 and 322, may tilt or swing vertically about an axis A1. Therefore, the projection positions of the illumination sources 330 and 332 are substantially similar for any panning and/or tilting that may occur in the LBI device 300.

Referring to FIG. 3B, there is shown a front view of an LBI device 350 that may comprise a base 360, forked arms 370 and 372, forked arms 380 and 382, and illumination sources 390 and 392. The housing material from which the various components of the LBI device 350 are made may be a weatherproof material like the one described above for the LBI device 200.

The base 360, the forked arms 370 and 372, and the forked arms 380 and 380 may be substantially similar to the base 210 and the forked arms 220 and 222 described above. The base 360, however, may enable the forked arms 370 and 372 to rotate about an axis B2 independently from the rotation of the forked arms 380 and 382 about an axis B3.

Each of the illumination sources 390 and 392 may be substantially similar to the illumination source 230 described above. However, some of the characteristics associated with the illumination source 390 may be different from those of the illumination source 392. For example, the two illumination sources may have different sources of light, may produce different temporal patterns (e.g., pulsating light beam), may have different colors, may produce light beams with different spot sizes, and/or may project different spatial patterns (e.g., images, shapes, letters, words, symbols). Accordingly, the LBI device 300 may select one or both illumination sources to project a light beam onto a target location that is in accordance with the type of activity that is taking place in that location.

As noted above, the forked arms 370 and 372, which are rotatably coupled to the base 360 independently from the forked arms 380 and 382, may pan or swing horizontally about the axis B2. Similarly, the forked arms 380 and 382, which are rotatably coupled to the base 360 independently from the forked arms 370 and 372, may pan or swing horizontally about the axis B3. The illumination source 390 may tilt or swing vertically about an axis A2 independently from the illumination source 392. Similarly, the illumination source 392 may tilt or swing vertically about an axis A3 independently from the illumination source 390. Because of the independent operation of the two illumination sources, the projection position of the illumination source 390 may be different from the projection position of the illumination source 392. Accordingly, the LBI device 300 may utilize one illumination source to project a light beam of certain characteristics onto a first target location and the other illumination source to project a light beam of different characteristics onto a second target location.

In some embodiments, one of the illumination sources 330 and 332 in the LBI device 300 may be replaced by a camera such as an analog camera 130 or a network-based camera 140. Similarly, one of the illumination sources 390 and 392 in the LBI device 350 may be replaced by a camera such as an analog camera 130 or a network-based camera 140.

Figure 4:
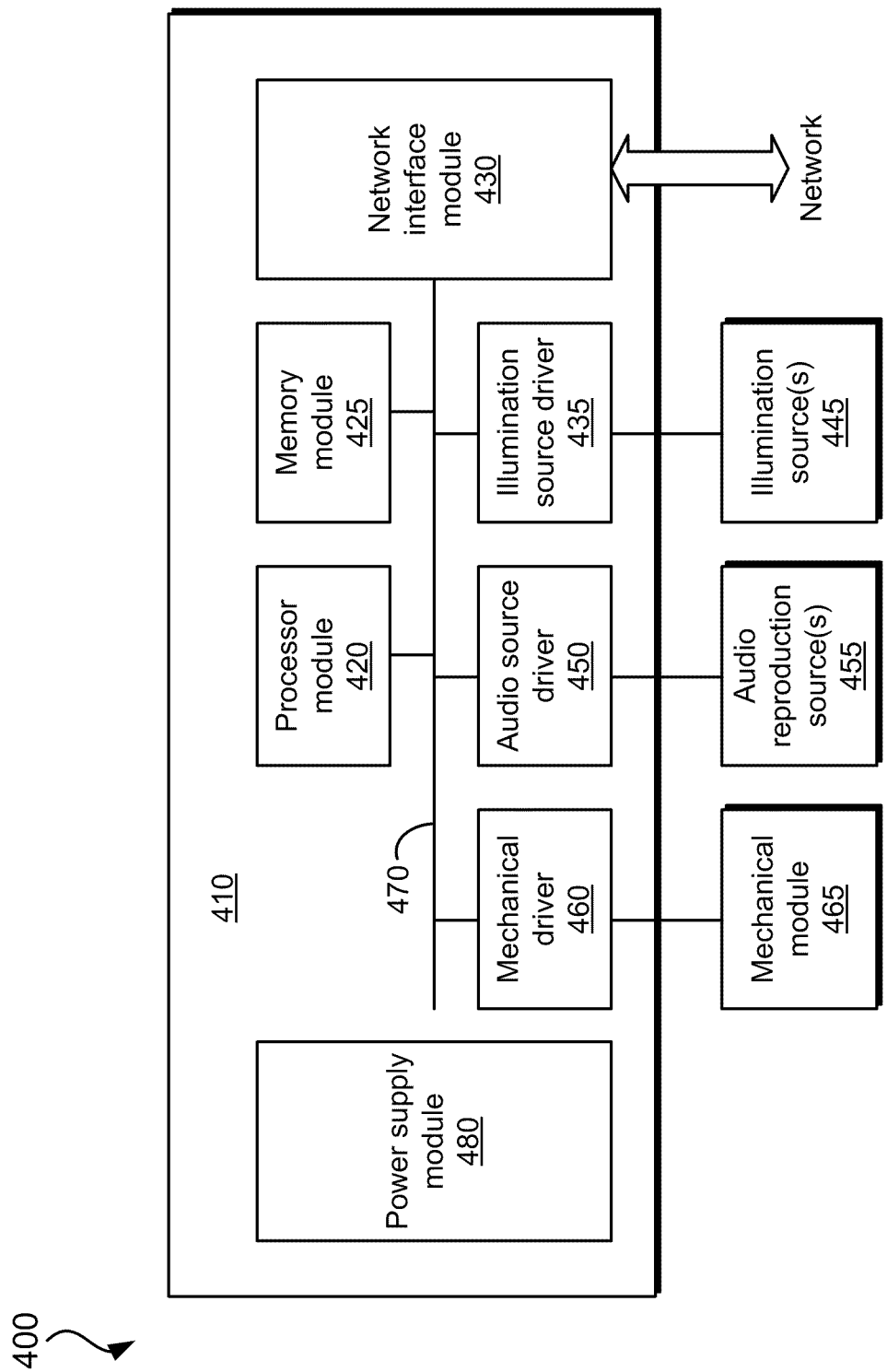
FIG. 4 is a block diagram that illustrates an example of a light-based intervention device architecture, in accordance with an embodiment of the disclosure.

FIG. 4 is a block diagram that illustrates an example of a light-based intervention device architecture, in accordance with an embodiment of the disclosure. Referring to FIG. 4, there is shown an LBI device architecture 400 that may comprise a controller 410, illumination source(s) 445, audio reproduction source(s) 455, and a mechanical module 465. The controller 410 may comprise a processor module 420, a memory module 425, a network interface module 430, an illumination source driver 435, an audio source driver 450, a mechanical driver 460, and a power supply module 480. The controller 410 may comprise a bus 470 through which the various modules and/or components in the controller 410 may communicate. The bus 470 may be a single bus or several busses.

The network interface module 430 may comprise suitable logic, circuitry, code, and/or interfaces that may be operable to communicate with a network, such as the network 110 described above with respect to FIG. 1. Data and/or control information may be received and/or transmitted through the network interface module 430. The network interface module 430 may be utilized to receive configuration information from the relay server 120, for example. Other types of information that may be received from a camera and/or the relay server 120 through the network interface module 430 may include, but need not be limited to, coordinates, location information, preset information, and/or scheduling information.

The processor module 420 may comprise suitable logic, circuitry, code, and/or interfaces that may be operable to process location information received through the network interface module 430. In this regard, the processor module 420 may be operable to generate multiple instructions to control the illumination source(s) 445, the audio reproduction source(s) 455, and/or the mechanical module 465 in response to the location information received. In some embodiments, the processor module 420 may be operable to receive coordinates of the location where the activity is taking place, which may include an estimate of the distance between the camera and the location of the activity, and may process the coordinates to generate the location information from which to control the illumination source(s) 445, the audio reproduction source(s) 455, and/or the mechanical module 465.

The memory module 425 may comprise suitable logic, circuitry, code, and/or interfaces that may be operable to store data and/or control information associated with light-based intervention. The memory module 425 may be utilized as part of the typical processing and/or control operations performed by the processor module 420. Moreover, the memory module 425 may be utilized to store projection information associated with one or more illumination sources and one or more audio reproduction sources. The stored information may comprise spatial and/or temporal pattern information, location information, preset information, scheduling information, and/or color information for light beam projection. The stored information may also comprise sound patterns, tones, and/or messages for audio reproduction.

The audio source driver 450 and the illumination source driver 435 may each comprise suitable logic, circuitry, code, and/or interfaces that may be operable to receive control information from the processor module 420 with which to control the operation of the audio reproduction source(s) 455 and the illumination source(s) 445, respectively.

In some embodiments, the audio source driver 450 and the illumination source driver 435 may each be operable to receive data from the audio reproduction source(s) 455 and the illumination source(s) 445, respectively. For example, the audio reproduction source(s) 455 may comprise a microphone (not shown) that may be used to capture sound information from the target location. In another example, the illumination sources(s) 445 may provide control feedback information, such as positional information, that may be utilized by the processor module 420 to control the projection position of one or more illumination sources in the illumination sources(s) 445. In addition, the illumination source(s) 445 may comprise one or more detectors that may provide environmental information that may be used by the processor module 420 to determine, for example, the amount of power or light intensity that may needed project a light beam onto a target location in an effective manner.

The audio reproduction source(s) 455 may comprise suitable logic, circuitry, code, and/or interfaces that may be operable to reproduce sound to be projected to a target location in which an activity of interest has been detected. The audio reproduction sources(s) 455 may comprise one or more audio sources, which may be used to project different tones, sounds, messages, or the like. The illumination source(s) 445 may correspond to the illumination sources 230, 330, 332, 390, and 392 described above with respect to FIGS. 2A-3B.

The mechanical driver 460 may comprise suitable logic, circuitry, code, and/or interfaces that may be operable to receive control information from the processor module 420 with which to control the operation of the mechanical module 465. The mechanical module 465 may comprise the mechanical and/or electromechanical devices and/or components (e.g., motors, gears, optical devices) used in the LIB devices 200, 300, and 350 to adjust the projection position of the illumination sources and/or to adjust the optical functions of those sources.

The power supply module 480 may comprise suitable logic, circuitry, code, and/or interfaces that may be operable to store and/or regulate power in the controller 410. In some embodiments, the power supply module 480 may comprise one or more batteries.

The LBI device architecture 400 described above is provided by way of illustration and not of limitation. Other architectures, configurations, modules, and/or components may be utilized to provide the functions and/or operations described herein for light-based intervention. Moreover, when a LBI device is integrated with and/or attached to a camera, some of the functionality that is currently performed by the LBI device architecture 400 may be provided by portions of the camera.

Figure 5A:
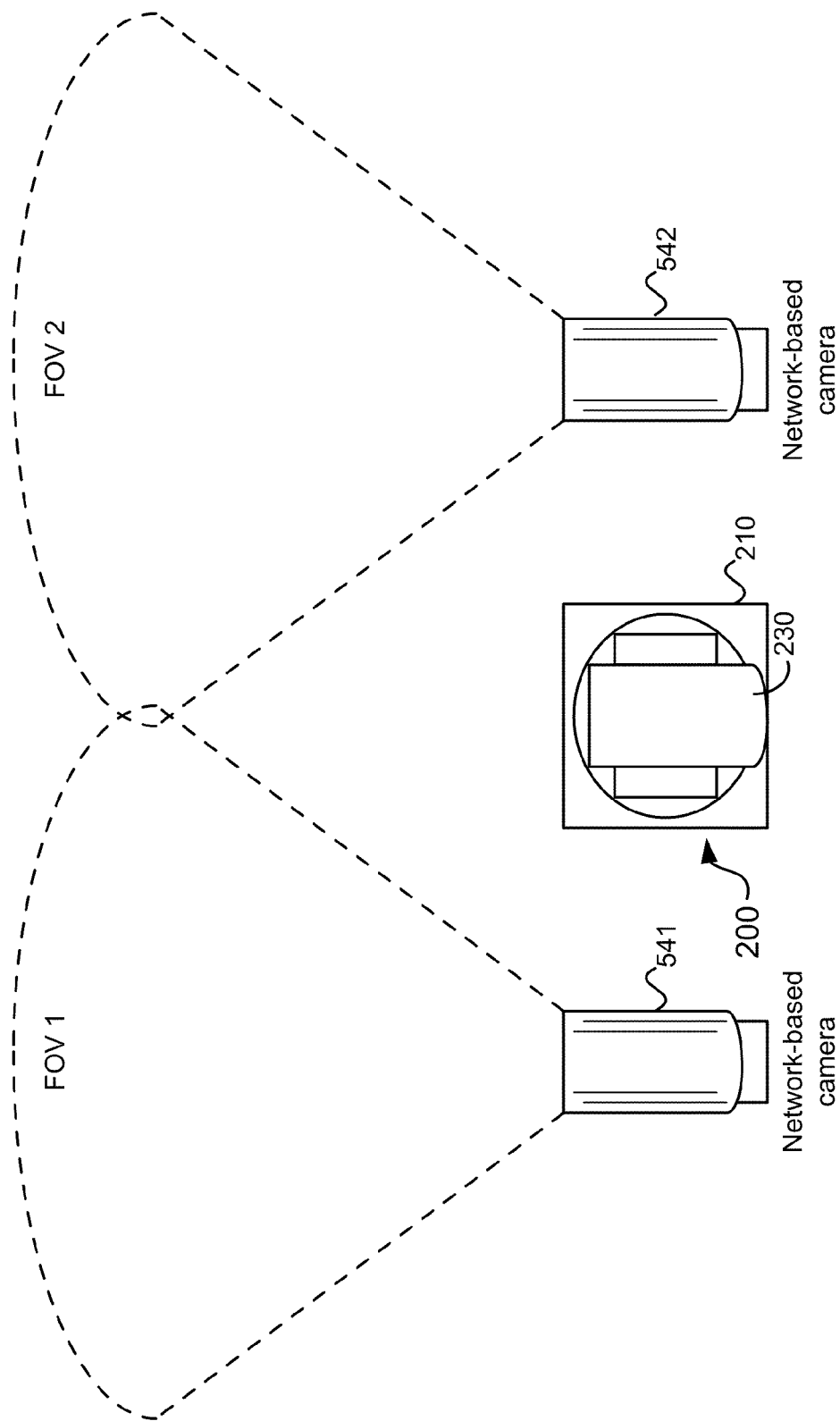
FIGS. 5A-5C are diagrams that illustrate examples of the operation of a light-based intervention device based on target location information from multiple surveillance cameras, in accordance with embodiments of the disclosure.
Figure 5B:
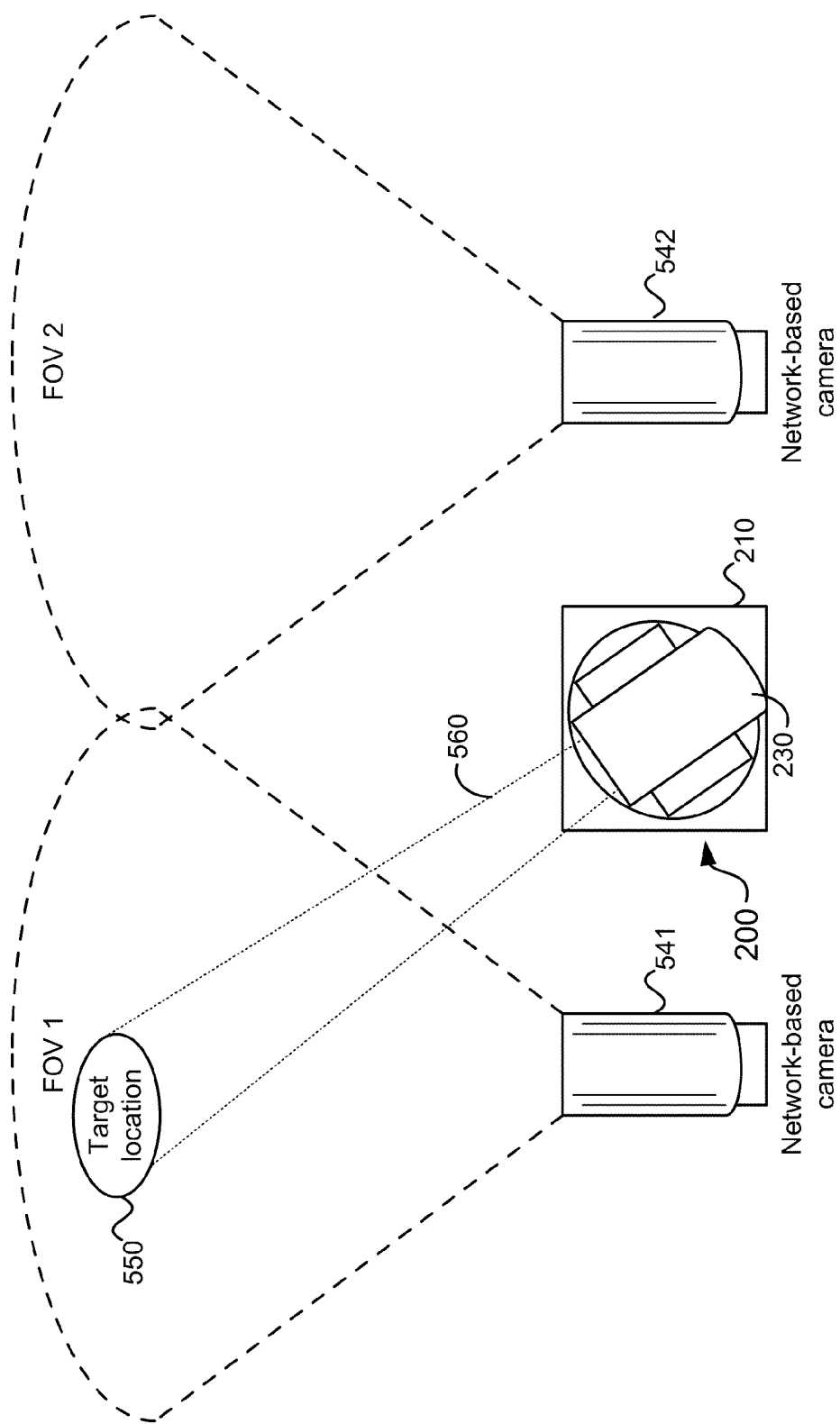
Figure 5C:
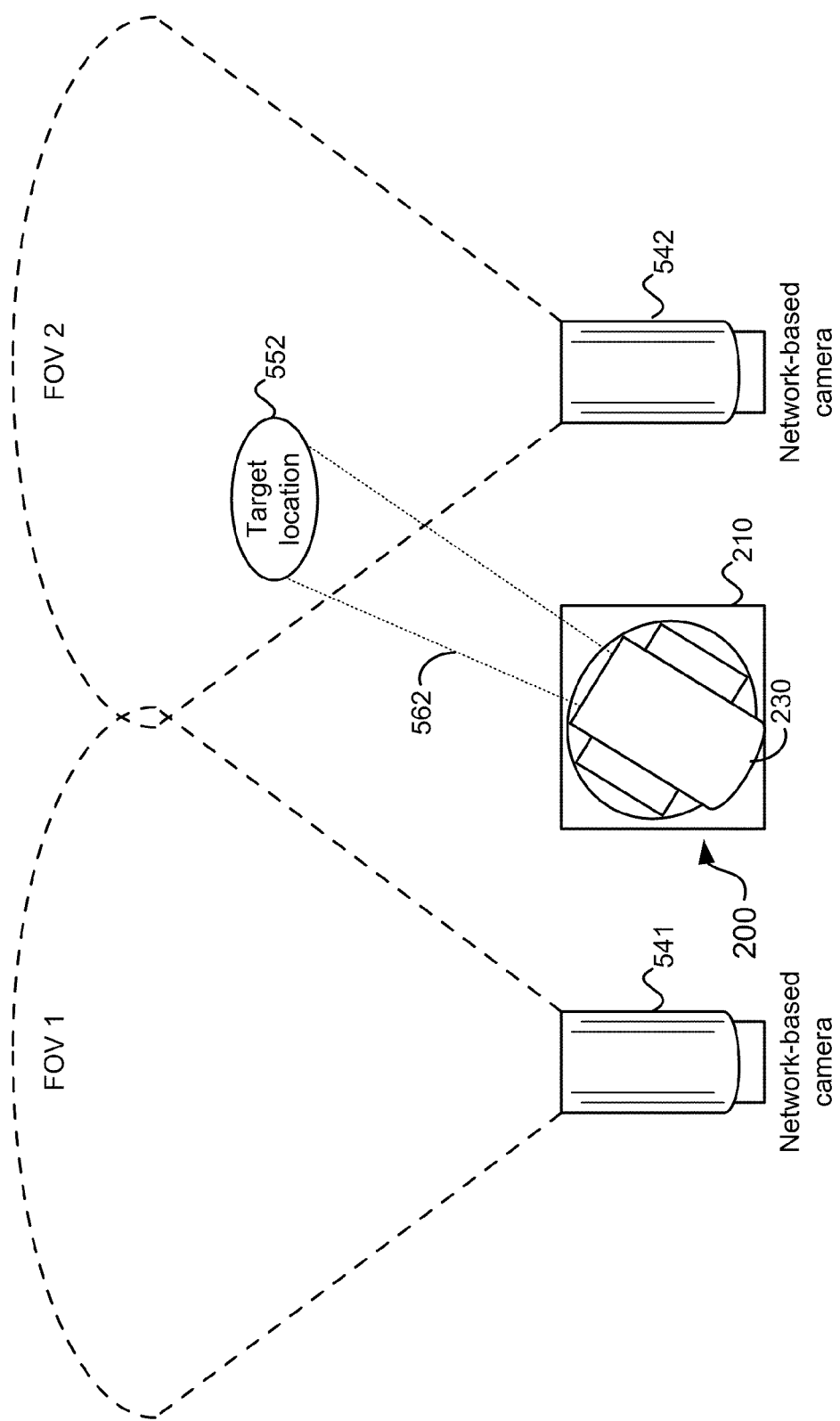

FIGS. 5A-5C are diagrams that illustrate examples of the operation of a light-based intervention device based on target location information from multiple surveillance cameras, in accordance with embodiments of the disclosure. Referring to FIG. 5A, there are shown network-based cameras 541 and 542, and the LBI device 200 described above with respect to FIGS. 2A-2C. The network-based cameras 541 and 542 may be substantially similar to the network-based camera 140 also described above. Moreover, the network-based cameras 541 and 542, and the LBI device 200, may be connected to a network such as the network 110 in the surveillance system 100.

The network-based camera 541 may comprise a field of view (FOV1) that covers a certain geographic region of the surveillance system. The network-based camera 542 may comprise a different field of view (FOV2) that covers another geographic region of the surveillance system. The cameras may be closely located such that the LBI device 200 may be utilized for light-based interventions that may occur in either of their geographic regions.

In the scenario illustrated in FIGS. 5A-5C, the network-based cameras 541 and 542 may be fixed or non-movable, and so are their corresponding areas of coverage. However, the projection position of the illumination source 230 of the LBI device 200 can be adjusted by panning and/or tilting. Moreover, the illumination source 230 can zoom and/or focus the light beam generated when appropriate or as necessary.

Referring back to FIG. 5A, the video content captured by both cameras may be processed by the cameras (e.g., smart cameras) or may be communicated to another portion of the surveillance system for processing. In this instance, no activity of concern is detected in either of the geographic regions being covered by the cameras. That is, neither an operator nor an automated processed based on video analytics has identified any of the content associated with the video captured by the two cameras as been problematic in any way. Accordingly, the LBI device 200 may remain in place awaiting instructions.

Referring to FIG. 5B, an event or activity that requires intervention is detected in the FOV1 of the network-based camera 541. In this instance, the LBI device 200 may receive control information, such as target location information, for example, from the network. With that information, the LBI device 200 may adjust the projection position of the illumination source 230 and may generate a light beam 560 that is projected onto a target location 550.

The type of pattern and/or other characteristics of the light beam 560 may be based on the type of activity that prompted the intervention. In this regard, the LBI device 200 may receive an indication of the type of activity taking place at the target location 550. Based on the indication, the LBI device 200 may select from among several options and/or characteristics that are available the ones that are more suitable for the generation of the light beam 560.

The LBI device 200 may subsequently receive instructions to generate a light beam for a different target location or to turn OFF the light beam 560. The LBI device 200 may also turn OFF the light beam 560 after a set amount of time has passed without receiving further instructions or control information.

Referring to FIG. 5C, another event or activity occurs that requires intervention, but this time the event or activity is detected in the FOV2 of the network-based camera 542. The LBI device 200 may receive control information, such as target location information, for example, from the network. The LBI device 200 may then adjust the projection position of the illumination source 230 to generate a light beam 562 that is projected onto a target location 552.

The type of pattern and/or other characteristics of the light beam 562 may be based on the type of activity that prompted the intervention. In this regard, the LBI device 200 may receive an indication of the type of activity taking place at the target location 552. Based on the indication, the LBI device 200 may select from among several options and/or characteristics that are available the ones that are more suitable for the generation of the light beam 562.

The LBI device 200 may subsequently receive instructions to generate a light beam for a different target location or to turn OFF the light beam 562. The LBI device 200 may also turn OFF the light beam 562 after a set amount of time has passed without receiving further instructions or control information.

While the LBI device 200 has been used in the examples shown in FIGS. 5A-5C, the disclosure need not be so limited. Other devices, such as the LBI device 300 or the LBI device 350, for example, may also be utilized. In such instances, a selection may be made regarding using one or both of the illumination sources available to those devices based on the type of intervention that is required.

Figure 6A:
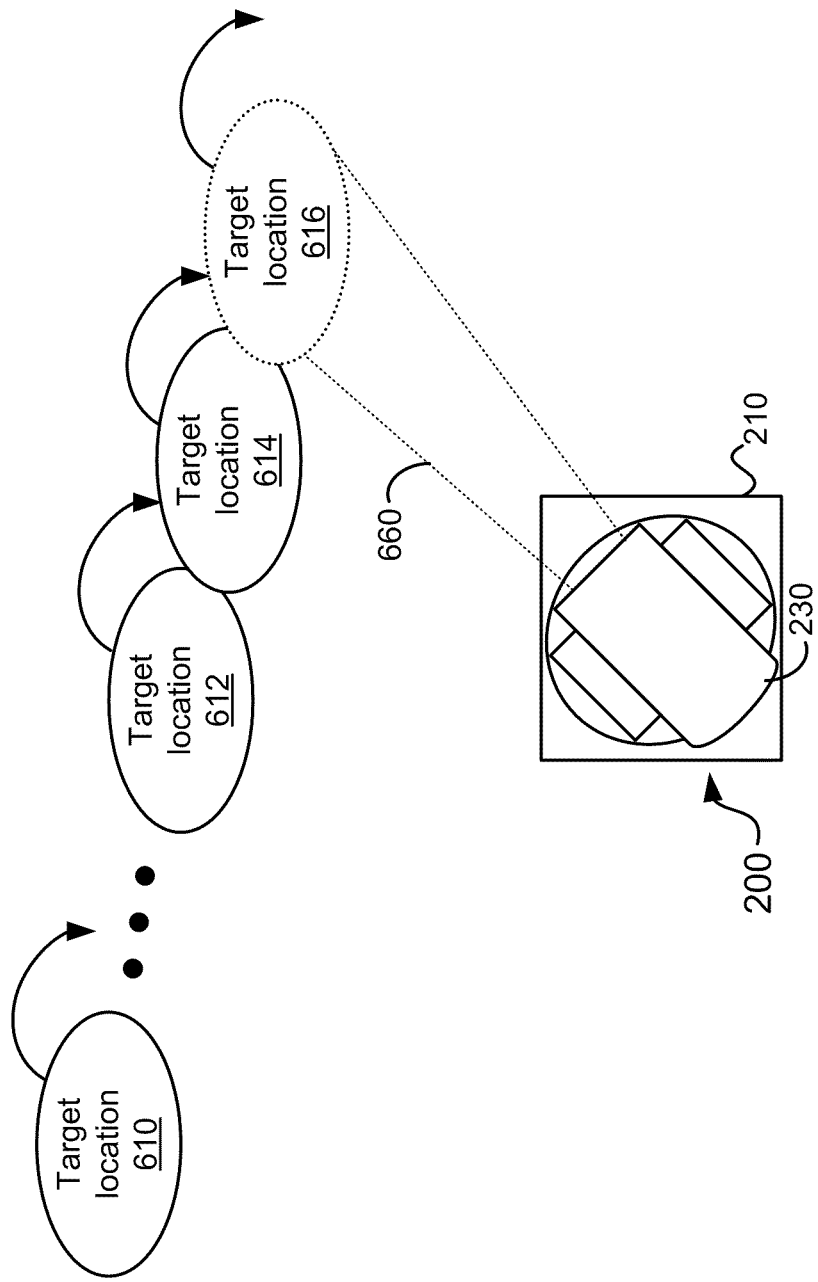
FIGS. 6A and 6B are diagrams that illustrate examples of target location sweeping by a light-based intervention device, in accordance with embodiments of the disclosure.
Figure 6B:
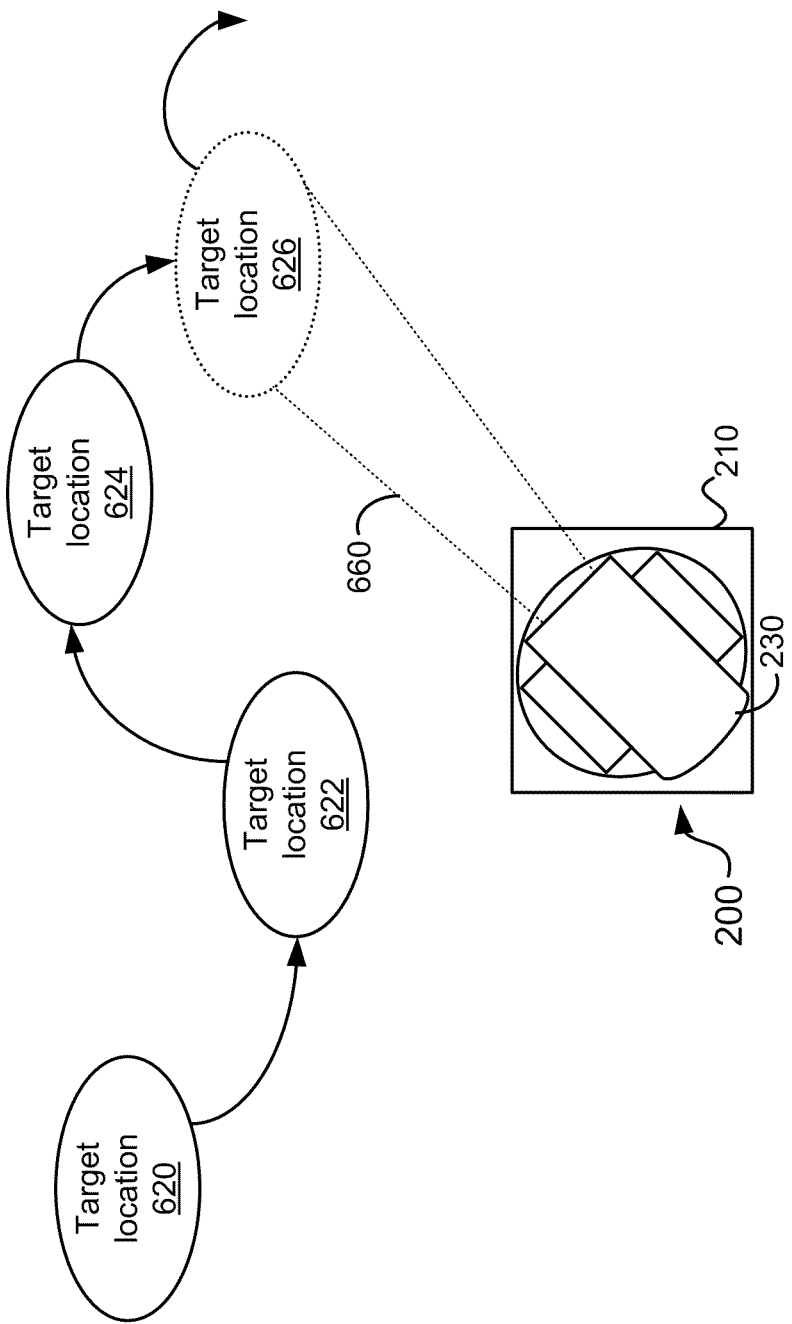

FIGS. 6A and 6B are diagrams that illustrate examples of target location sweeping by a light-based intervention device, in accordance with embodiments of the disclosure. Referring to FIG. 6A, there is shown the LBI device 200 performing a target location sweep. A target location sweep may take place when the surveillance system is being used for monitoring a certain geographic area at particular times. The LBI device 200 may receive a schedule or other type of sweeping data that indicates the information for multiple target locations and a time at which each target location is to receive a projected light beam. The schedule or sweeping data may be stored in memory, such as the memory module 425.

The sweeping pattern shown in FIG. 6A is a substantially linear pattern in which a series of target locations 610, 612, 614, and 616 are projected onto at different times by a light beam 660 generated by the LBI device 200. The arrows indicate the order of the sweeping pattern with target location 610 being first, followed by target locations 612, 614, and 616 in close order. Both the target locations and the times at which the target locations are projected onto are fairly close in the sweeping pattern shown in FIG. 6A.

Referring to FIG. 6B, a different sweeping pattern is shown that is more intermittent and in which a series of target locations 620, 622, 624, and 626 are projected onto at different times by the light beam 660 generated by the LBI device 200. Again, the arrows indicate the order of the sweeping pattern with target location 620 being first, followed by target location 622, which in turn is followed by target location 624, and target location 626 being the last one shown. Both the target locations and the times at which the target locations are projected onto are somewhat spread apart in the sweeping pattern shown in FIG. 6B.

Figure 7A:
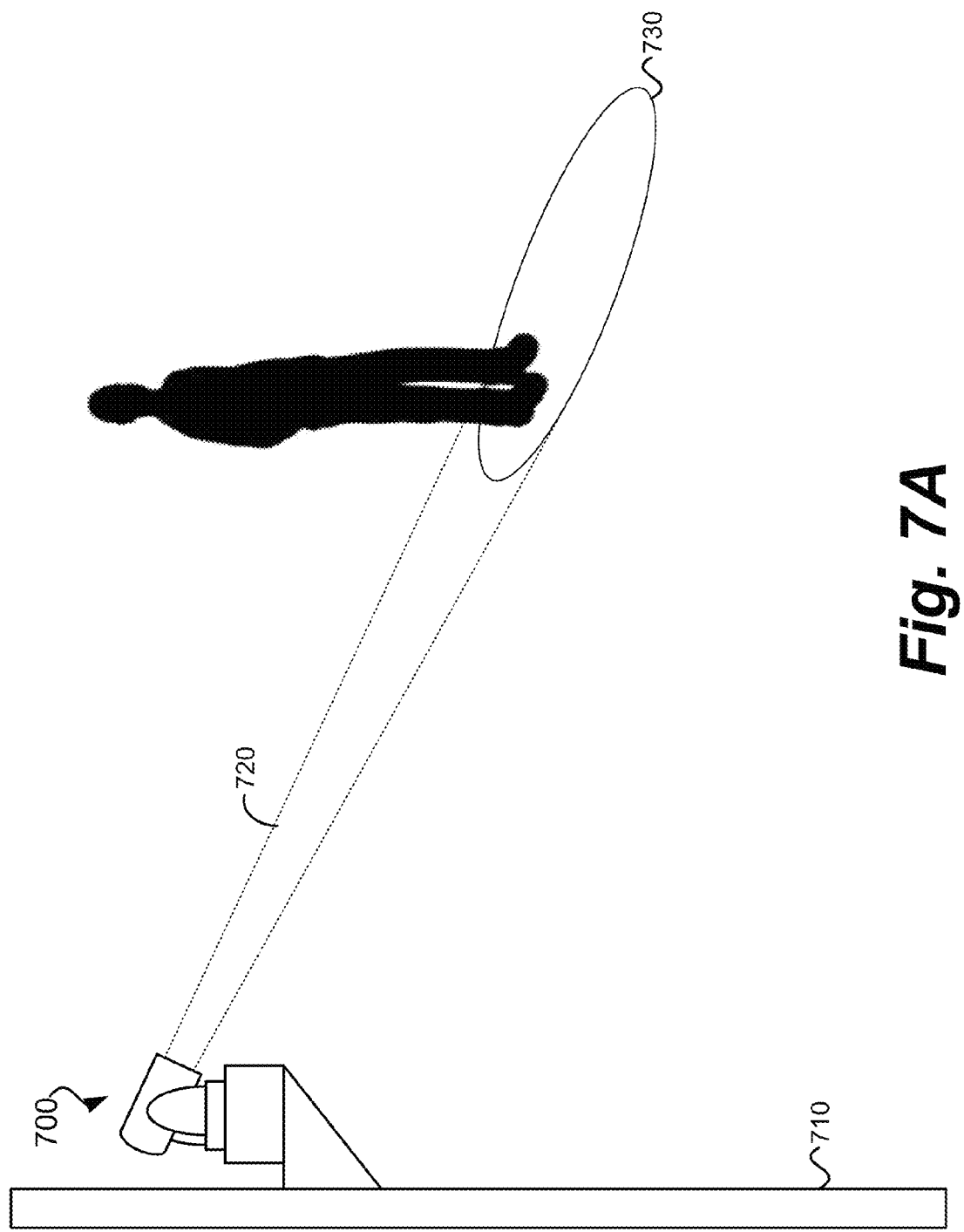
FIGS. 7A and 7B are diagrams that illustrate examples of different patterns projected by a light-based intervention device based on the type of situation taking place at the target location, in accordance with embodiments of the disclosure.
Figure 7B:
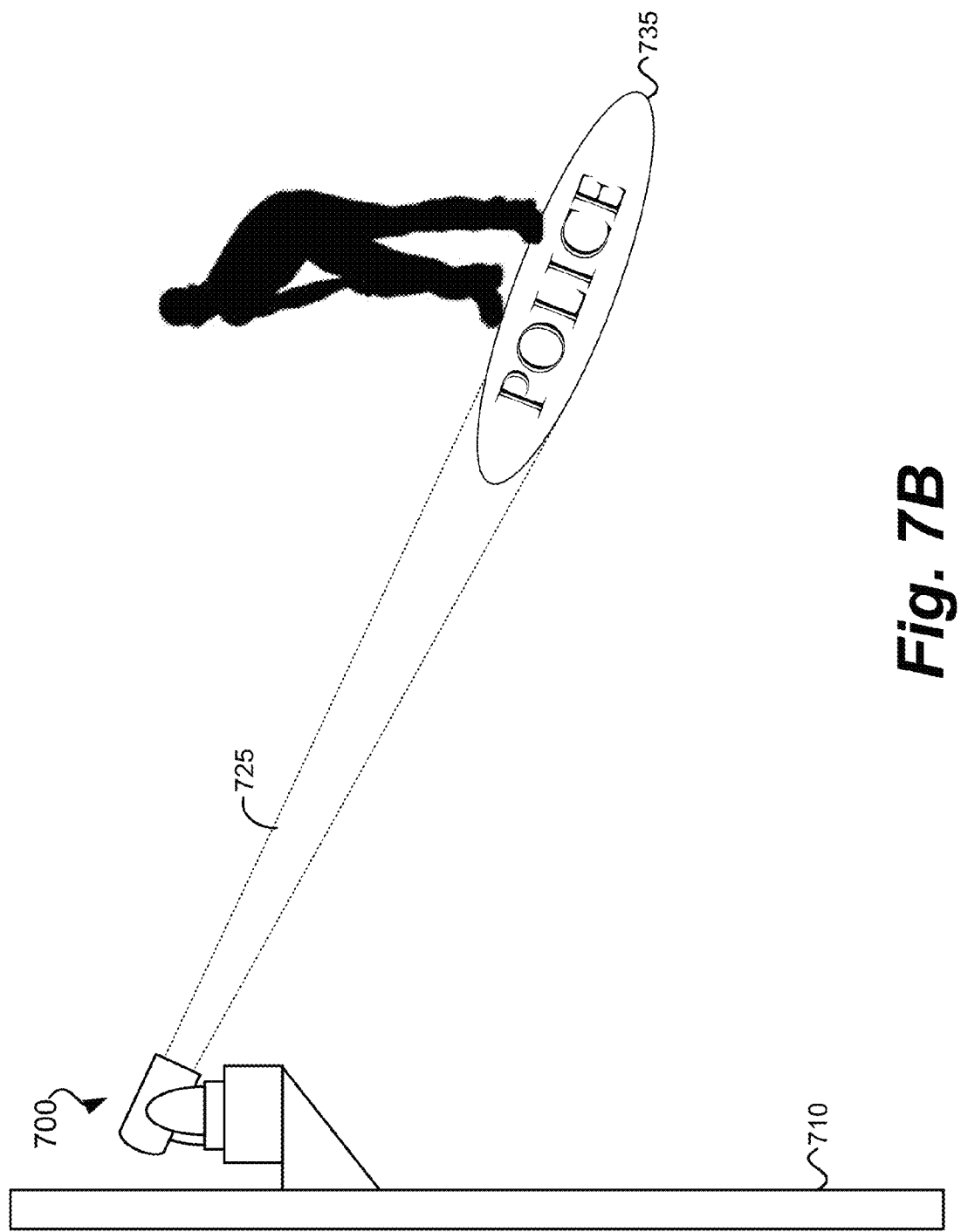

FIGS. 7A and 7B are diagrams that illustrate examples of different patterns projected by a light-based intervention device based on the type of situation taking place at the target location, in accordance with embodiments of the disclosure. Referring to FIG. 7A, there is shown an LBI device 700 attached to a structure 710 (e.g., building, pole). The LBI device 700 may be substantially similar to the LBI devices described above and may be used in a variety of ways to meet specific community public safety needs. For example, the LBI device 700 may be utilized to provide public comfort and reduce anxiety in the event of an accident or other situation requiring assistance.

In the scenario shown in FIG. 7A, the LBI device 700 may be utilized to project a light beam 720 onto a target location 730 to signal and alert a person walking at night in a parking lot or transportation node of police or security presence. This kind of signaling may reassure that person and/or may warn potential offenders, thus preventing and reducing fear of crime. In a similar scenario, the LBI device 700 may be utilized to project the light beam 720 onto the target location 730 to signal an accident victim (e.g., someone injured due to a fall at a desolate area, etc.) that the police is aware of the incident and that help is on the way, thus reducing anxiety and reassuring the victim.

Referring to FIG. 7B, there is shown a different scenario in which the LBI device 700 may be utilized to project a light beam 725 onto a target location 735 to display the word "POLICE," thereby "painting" the offender to make him or her aware that there is active monitoring and observation by police personnel, that video footage of the event may be available, and/or that law enforcement or security personnel are responding to the scene.

Figure 8A:
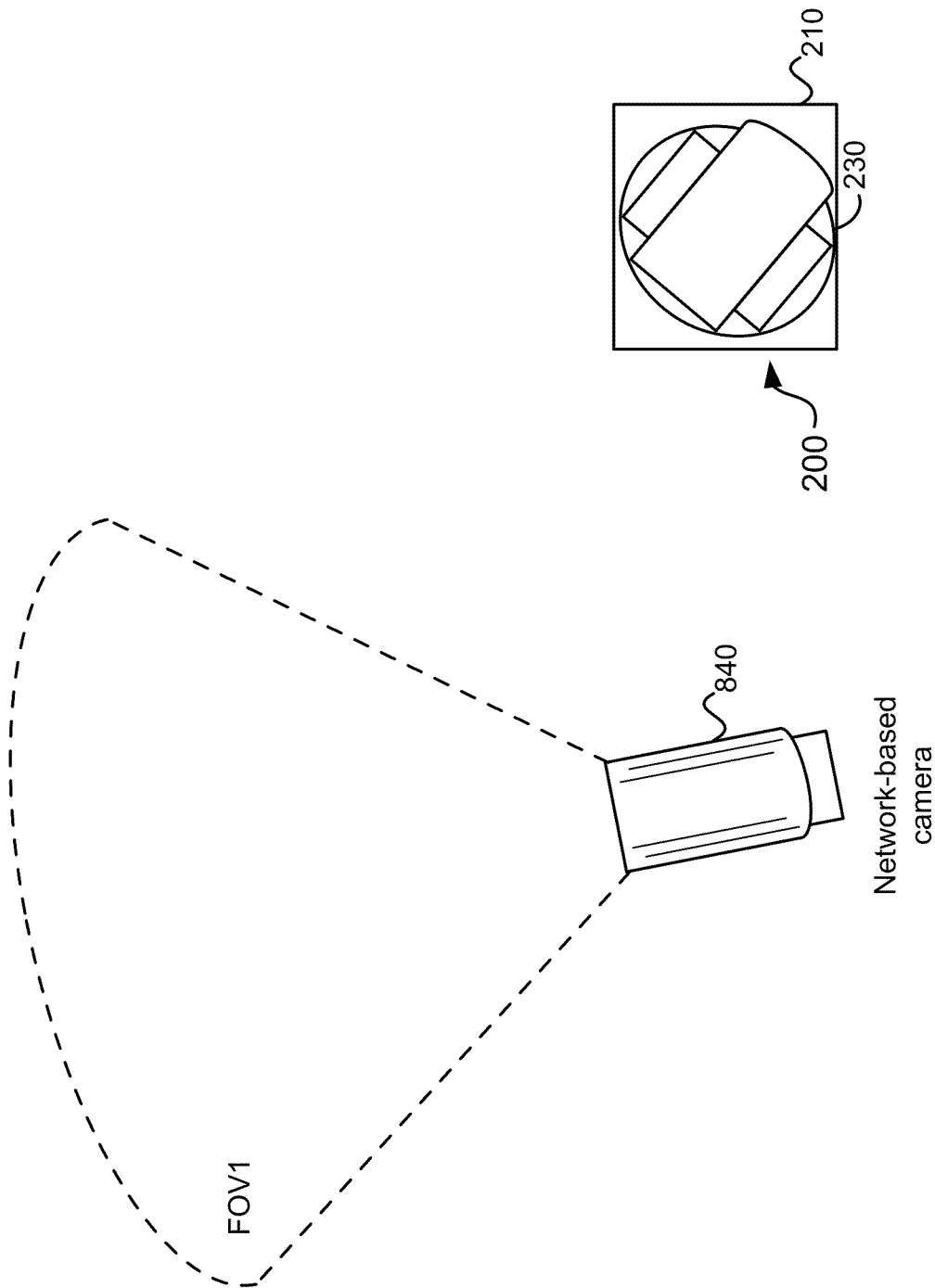
FIGS. 8A and 8B are diagrams that illustrate examples of synchronization between a light-based intervention device and a surveillance camera, in accordance with embodiments of the disclosure.
Figure 8B:
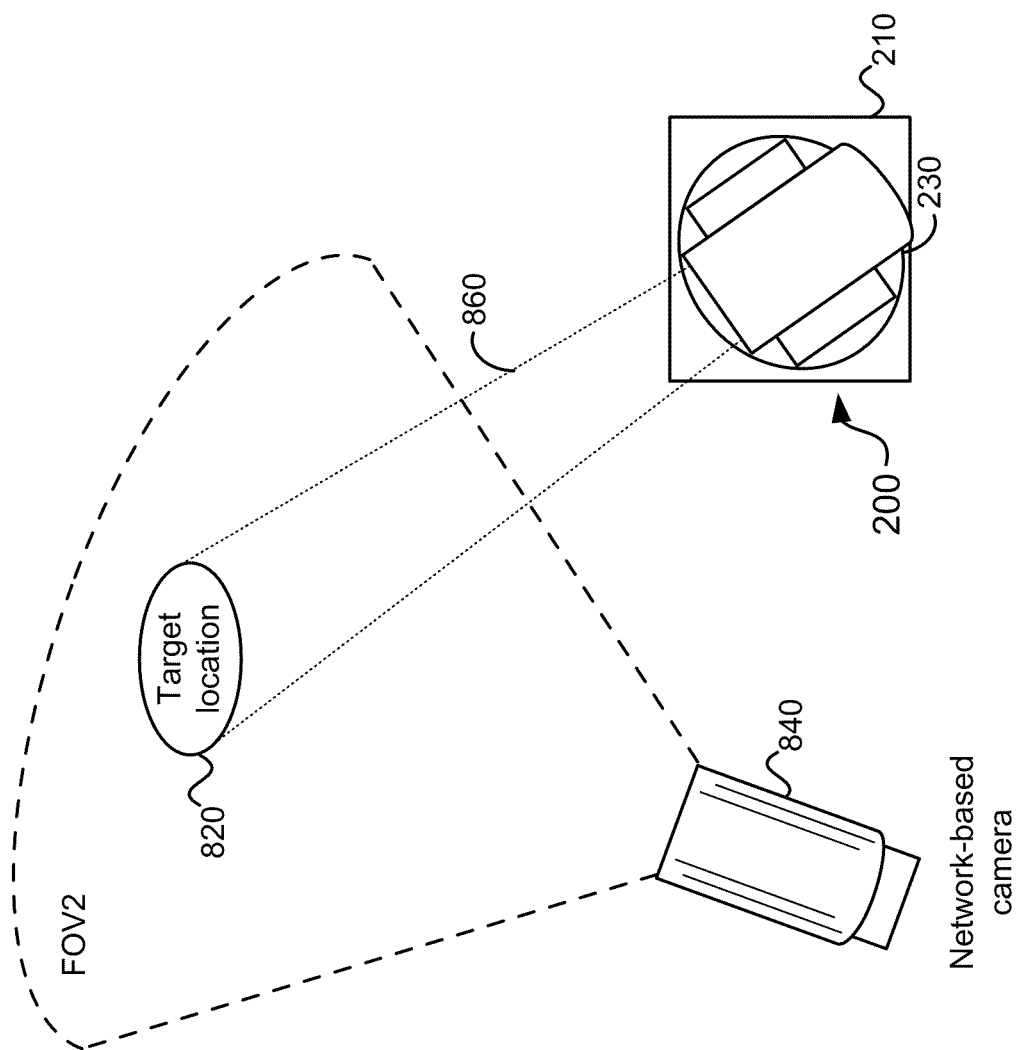

FIGS. 8A and 8B are diagrams that illustrate examples of synchronization between a light-based intervention device and a surveillance camera, in accordance with embodiments of the disclosure. Referring to FIG. 8A, there is shown a network-based camera 840 and the LBI device 200 described above with respect to FIGS. 2A-2C. The network-based camera 840 may be substantially similar to the network-based camera 140 also described above. Moreover, the network-based camera 840 and the LBI device 200 may be connected to a network such as the network 110 in the surveillance system 100.

The network-based camera 840 may comprise a field of view (FOV1) that covers a certain geographic region of the surveillance system. In this instance, the LBI device 200 is a slave to the network-based camera 840. In other words, the projection position of the illumination source 230 of the LBI device 200 may track or move according with any changes in the capture position of the network-based camera 840. In this manner, when an event or activity that requires action by the LBI device 200 takes place in the geographic region currently being covered by the network-based camera 840, the LBI device 200 is available for almost immediate intervention.

In the scenario shown in FIG. 8A, there is no activity that is deemed of concern or problematic based on the video being captured by the network-based camera 840. Nevertheless, the LBI device 200 is ready to project a light beam onto the current geographic region being covered by the network-based camera 840 in case an intervention is needed.

Referring to FIG. 8B, the network-based camera 840 has moved to cover a new geographic region and therefore has a new field of view, FOV2. In this instance, an event or activity that requires intervention is detected in the FOV2 of the network-based camera 840. The slaved LBI device 200 has tracked the motion of the network-based camera 840 and has adjusted the projection position of the illumination source 230 accordingly. The LBI device 200 may receive control information, such as target location information, for example, from the network. With that information, the LBI device 200 may perform a quick and minor adjustment, if necessary, to the projection position of the illumination source 230. Then, the LBI device 200 may generate a light beam 860 that is projected onto a target location 820.

The type of pattern and/or other characteristics of the light beam 860 may be based on the type of activity that prompted the intervention. In this regard, the LBI device 200 may receive an indication of the type of activity taking place at the target location 820. Based on the indication received, the LBI device 200 may then select from among several options and/or characteristics available the ones that are more suitable for the generation of the light beam 860.

The LBI device 200 may subsequently receive instructions to generate a light beam for a different target location or to turn OFF the light beam 860. The LBI device 200 may also turn OFF the light beam 860 after a set amount of time has passed without receiving further instructions or control information.

While the LBI device 200 has been used in the examples shown in FIGS. 8A and 8B, the disclosure need not be so limited. Other devices, such as the LBI device 300 or the LBI device 350, for example, may also be utilized for slaving or synchronization. In such instances, a selection may be made regarding using one or both of the illumination sources available to those devices based on the type of intervention that is required.

The slaving or synchronization described above with respect to FIGS. 8A and 8B may be utilized for touring operations as well. These operations may comprise having the network-based camera 840 and the LBI device 200 move in a coordinated manner, through a series of preset positions at designated times and for a certain duration, to take time-stamped snapshots or short video clips of the target locations associated with the preset positions. The snapshots or video clips may be stored and subsequently accessed for analysis, which may result in the identification of location-based behavioral trends.

Figure 9:
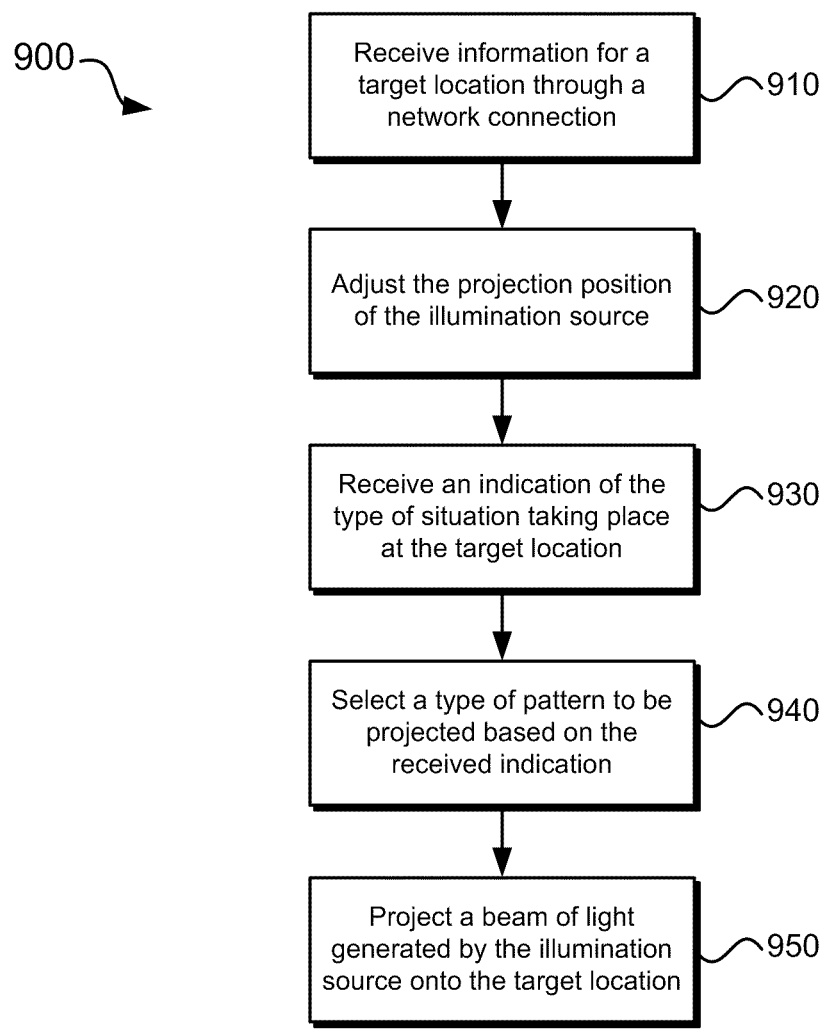
FIG. 9 is a flow chart that illustrates examples of steps for operating a light-based intervention device, in accordance with an embodiment of the disclosure.

FIG. 9 is a flow chart that illustrates examples of steps for operating a light-based intervention device, in accordance with an embodiment of the disclosure. Referring to FIG. 9, there is shown a flow chart 900 in which, at 910, a light-based intervention device, such as the LBI devices 200, 300, and 350 described above, may receive information for a target location through a network connection, such as a connection to the network 110 in the surveillance system 100. The information may be received through an interface such as the network interface module 430 shown in FIG. 4, for example. At 920, the light-based intervention device may adjust the projection position of the illumination source. For example, when the light-based intervention device is the LBI device 200, the illumination source 230 may be panned and/or tilted based on the target location received.

At 930, the light-based intervention device may receive an indication of the type of situation or activity that is taking place at the target location and that has prompted the need for intervention. At 940, the light-based intervention device may select a type of pattern and/or other characteristic of the light beam to be generated based on the received indication. In this case, the type of information that needs to be conveyed by the patterns and/or characteristics of the light beam may be different based on the situation that is taking place. At 950, the light-based intervention device may generate and project a light beam with the appropriate pattern and/or other characteristics onto the target location.

Figure 10:
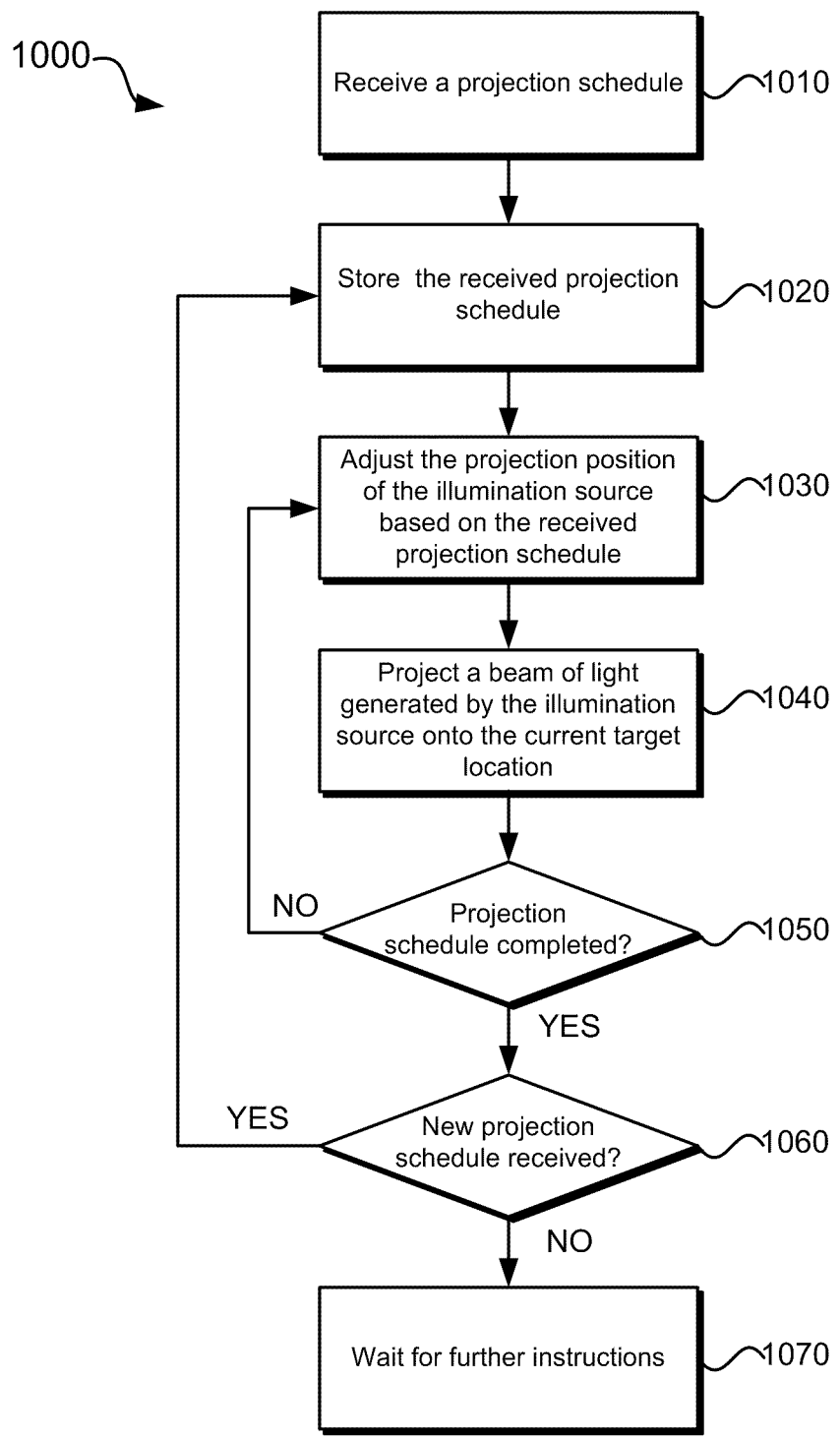
FIG. 10 is a flow chart that illustrates examples of steps for automated sweeping using a light-based intervention device, in accordance with an embodiment of the disclosure.

FIG. 10 is a flow chart that illustrates examples of steps for automated sweeping using a light-based intervention device, in accordance with an embodiment of the disclosure. Referring to FIG. 10, there is shown a flow chart 1000 in which at 1010, a light-based intervention device, such as the LBI devices 200, 300, and 350 described above, may receive a projection schedule. The projection schedule may be associated with a sweeping operation, a slaving or synchronization operation, and/or a touring operation, for example. At 1020, the projection schedule may be stored in a controller memory such as the memory module 425 shown in FIG. 4, for example.

At 1030, the light-based intervention device may adjust the projection position of the illumination source in accordance with the target location information, the sequence information, and/or the timing and duration information in the projection schedule. For example, when the light-based intervention device is the LBI device 200, the illumination source 230 may be panned and/or tilted at the appropriate times based on projection scheduled received.

At 1040, the light-based intervention device may generate and project a light beam onto the current target location in the projection schedule. At 1050, when the sequence of target locations in the projection schedule have not been completed, the process may proceed to 1030 where the next target location is addressed. Otherwise, the process may proceed to 1060. At 1060, the light-based intervention device may verify whether there is another projection schedule that has been received and needs to be executed. When a new projection schedule has been received, the process may proceed to 1020, the projection schedule may be stored for later use. Otherwise, the process may proceed to 1070 where the light-based intervention device awaits for control and/or other instructions from the network.

Another embodiment of the disclosure may provide a non-transitory machine and/or computer readable storage and/or medium, having stored thereon, a machine code and/or a computer program having at least one code section executable by a machine and/or a computer, thereby causing the machine and/or computer to perform the steps as described herein for light-based intervention.

Accordingly, the present disclosure may be realized in hardware, software, or a combination of hardware and software. The present disclosure may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
in a device comprising an illumination source operable to generate a light beam having an associated light beam spot:
receiving information for a target location, the target location identifying a location of an activity detected from video captured by a surveillance camera, the information being generated by the surveillance camera or by a server in communication with the surveillance camera from coordinates obtained by the surveillance camera of the location of the detected activity, and the coordinates including an estimate of a distance between the surveillance camera and the location of the detected activity;
adjusting a projection position of the illumination source based on the received information for the target location;
receiving an indication of a type of detected activity taking place at the target location through a network connection, the indication being based on the video captured by the surveillance camera;
selecting, based on the received indication of the type of detected activity, a type of spatial pattern produced by the light beam spot that the light beam is to project onto the target location, wherein the type of spatial pattern for the light beam is selected from a first type of spatial pattern and a second type of spatial pattern supported by the illumination source, the first type of spatial pattern being configured to indicate monitoring by law enforcement or security personnel to deter or stop illegal or criminal activity at the target location, the second type of spatial pattern being different from the first type of spatial pattern by having the illumination source generate light beams with different characteristics for the first type of spatial pattern and for the second type of spatial pattern, and the second type of spatial pattern being configured to indicate to an injured person or someone in a desolate area that law enforcement or security personnel is monitoring the area and assistance is on its way or readily available; and
projecting, after the projection position of the illumination source is adjusted and the type of spatial pattern is selected, the light beam generated by the illumination source onto the target location.

2. The method of claim 1, wherein the projected light beam projects the selected type of spatial pattern produced by the light beam spot onto the target location by modifying one or more of the characteristics of the light beam according to the type of detected activity at the target location.

3. The method of claim 2, wherein the selected type of spatial pattern produced by the light beam spot comprises an image, a letter, a word, a symbol, or a combination thereof, associated with a type of detected activity at the target location.

4. The method of claim 1, wherein the device comprises an additional illumination source, the method comprising:
   selecting a source from among the illumination source and the additional illumination source based on the received indication and on types of spatial patterns produced by each source, wherein the selected source is to apply the selected type of spatial pattern to a light beam generated by the selected source;
   adjusting a projection position of the selected source based on the received information for the target location; and
   projecting, after the projection position of the selected source is adjusted and the type of spatial pattern is selected, the light beam generated by the selected source onto the target location.

5. The method of claim 1, wherein:
   the light beam is a first light beam, the illumination source being operable to project the first light beam with the first type of spatial pattern by modifying one or more of the characteristics of the first light beam; and
   the device comprises an additional illumination source operable to generate a second light beam and project the second light beam with the second type of spatial pattern by modifying one or more characteristics the second light beam, and the method comprising:
      selecting a source from among the illumination source and the additional illumination source based on the selected type of spatial pattern;
      adjusting a projection position of the selected source based on the received information for the target location; and
      projecting, after the projection position of the selected source is adjusted and the type of spatial pattern is selected, a light beam generated by the selected source onto the target location.

6. The method of claim 1, comprising synchronizing movements of the illumination source to movements of the surveillance camera to track changes in a capture position of the surveillance camera.

7. The method of claim 1, comprising receiving the information for the target location through a network connection.

8. The method of claim 1, comprising receiving information for the target location from the surveillance camera through a network connection.

9. A method, comprising:
   in a device comprising an illumination source operable to generate a light beam having an associated light beam spot, the device being operable to receive information for a target location identifying a location of an activity detected from video captured by a surveillance camera and an indication of a type of detected activity taking place at the target location through a network connection, the indication being based on the video captured by the surveillance camera, the information being generated by the surveillance camera or by a server in communication with the surveillance camera from coordinates obtained by the surveillance camera of the location of the detected activity, the coordinates including an estimate of a distance between the surveillance camera and the location of the detected activity, the device being further operable to select, based on the received indication of the type of detected activity, a type of spatial pattern produced by the light beam spot that the light beam is to project onto the target location, wherein the type of spatial pattern for the light beam is selected from a first type of spatial pattern and a second type of spatial pattern supported by the illumination source, the first type of spatial pattern being configured to indicate monitoring by law enforcement or security personnel to deter or stop illegal or criminal activity at the target location, and the second type of spatial pattern being different from the first type of spatial pattern by having the illumination source generate light beams with different characteristics for the first type of spatial pattern and for the second type of spatial pattern, and the second type of spatial pattern being configured to indicate to an injured person or someone in a desolate area that law enforcement or security personnel is monitoring the area and assistance is on its way or readily available, and the device being further operable to adjust a projection position of the illumination source based on the received information:
   receiving a projection schedule for other target locations;
   adjusting the projection position of the illumination source based on the received projection schedule; and
   projecting, after the projection position of the illumination source is adjusted for each of the other target locations and the type of spatial pattern is selected, the light beam generated by the illumination source onto the respective one of the other target locations.

10. The method of claim 9, comprising receiving a new projection schedule through a network connection.

11. The method of claim 9, wherein the device is operable to receive information for the one or more target locations through a network connection.

12. A system, comprising:
   a device comprising an illumination source operable to generate a light beam having an associated light beam spot, and the device being operable to:
      receive information for a target location, the target location identifying a location of an activity detected from video captured by a surveillance camera, the information being generated by the surveillance camera or by a server in communication with the surveillance camera from coordinates obtained by the surveillance camera of the location of the detected activity, and the coordinates including an estimate of a distance between the surveillance camera and the location of the detected activity;
      adjust a projection position of the illumination source based on the received information for the target location;
      receive an indication of a type of detected activity taking place at the target location through a network connection, the indication being based on the video captured by the surveillance camera;
      selecting, based on the received indication of the type of detected activity, a type of spatial pattern produced by the light beam spot that the light beam is to project onto the target location, wherein the type of spatial pattern for the light beam is selected from a first type of spatial pattern and a second type of spatial pattern supported by the illumination source, the first type of spatial pattern being configured to indicate monitoring by law enforcement or security personnel to deter or stop illegal or criminal activity at the target location, and the second type of spatial pattern being different from the first type of spatial pattern by having the illumination source generate light beams with different characteristics for the first type of spatial pattern and for the second type of spatial pattern, and the second type of spatial pattern being configured to indicate to an injured person or someone in a desolate area that law enforcement or security personnel is monitoring the area and assistance is on its way or readily available; and project, after the projection position of the illumination source is adjusted and the type of spatial pattern is selected, the light beam generated by the illumination source onto the target location.

13. The system of claim 12, wherein the projected light beam projects the selected type of spatial pattern produced by the light beam spot onto the target location by modifying one or more of the characteristics of the light beam according to the type of detected activity at the target location.

14. The system of claim 13, wherein the selected type of spatial pattern produced by the light beam spot comprises an image, a letter, a word, a symbol, or a combination thereof, associated with a type of detected activity at the target location.

15. The system of claim 12, wherein the device comprises an additional illumination source and is operable to:
 select a source from among the illumination source and the additional illumination source based on the received indication and on types of spatial patterns produced by each source, wherein the selected source is to apply the selected type of spatial pattern to a light beam generated by the selected source;
 adjust a projection position of the selected source based on the received information for the target location; and
 project, after the projection position of the selected source is adjusted and the type of spatial pattern is selected, the light beam generated by the selected source onto the target location.

16. The system of claim 12, wherein:
 the light beam is a first light beam, the illumination source being operable to project the first light beam with the first type of spatial pattern by modifying one or more of the characteristics of the first light beam;
 the device comprises an additional illumination source operable to generate a second light beam and project a second light beam with the second type of spatial pattern by modifying one or more characteristics of the second light beam; and
 the device is operable to:
  select a source from among the illumination source and the additional illumination source based on the selected type of spatial pattern;
  adjust a projection position of the selected source based on the received information for the target location; and
  project, after the projection position of the selected source is adjusted and the type of spatial pattern is selected, a light beam generated by the selected source onto the target location.

17. The system of claim 12, wherein the device is operable to synchronize movements of the illumination to movements of the surveillance camera to track changes in a capture position of the surveillance camera.

18. The system of claim 12, wherein the device is operable to receive the information for the target location through a network connection.

19. The system of claim 12, wherein the device is operable to receive the information for the target location from the surveillance camera through a network connection.

20. A system, comprising:
 a device comprising an illumination source operable to generate a light beam having an associated light beam spot, and the device being operable to:
  receive information for a target location, the target location identifying a location of an activity detected from video captured by a surveillance camera and an indication of a type of detected activity taking place at the target location through a network connection, the indication being based on the video captured by the surveillance camera, the information being generated by the surveillance camera or by a server in communication with the surveillance camera from coordinates obtained by the surveillance camera of the location of the detected activity, and the coordinates including an estimate of a distance between the surveillance camera and the location of the detected activity;
  select, based on the received indication of the type of detected activity, a type of spatial pattern produced by the light beam spot that the light beam is to project onto the target location, wherein the type of spatial pattern for the light beam is selected from a first type of spatial pattern and a second type of spatial pattern supported by the illumination source, the first type of spatial pattern being configured to indicate monitoring by law enforcement or security personnel to deter or stop illegal or criminal activity at the target location, the second type of spatial pattern being different from the first type of spatial pattern by having the illumination source generate light beams with different characteristics for the first type of spatial pattern and for the second type of spatial pattern, and the second type of spatial pattern being configured to indicate to an injured person or someone in a desolate area that law enforcement or security personnel is monitoring the area and assistance is on its way or readily available,
  adjust a projection position of the illumination source based on the received information;
  receive a projection schedule for other target locations;
  adjust the projection position of the illumination source based on the received projection schedule; and
  project, after the projection position of the illumination source is adjusted for each of the other target locations and the type of spatial pattern is selected, the light beam generated by the illumination source onto the respective one of the other target locations.

21. The system of claim 20, wherein the device is operable to receive a new projection schedule through a network connection.

22. The system of claim 20, wherein the device is operable to receive information for the one or more target locations through a network connection.

23. The method of claim 1, wherein adjusting a projection position of the illumination source based on the received information generated from coordinates obtained by the surveillance camera of the location of the detected activity comprises adjusting the projection position through a series of preset projection positions for the illumination source at designated times to synchronize the series of preset projection positions with a corresponding series of preset capture positions for the surveillance camera.

24. The method of claim 9, wherein adjusting a projection position of the illumination source based on the received information generated from coordinates obtained by the surveillance camera of the location of the detected activity comprises adjusting the projection position through a series of preset projection positions for the illumination source at designated times to synchronize the series of preset projection positions with a corresponding series of preset capture positions for the surveillance camera.

25. A method, comprising:
in a device comprising a first illumination source and a second illumination source coupled together with the first illumination source, the first illumination source being operable to generate a first light beam having an associated first light beam spot, the second illumination source being operable to generate a second light beam having an associated second light beam spot, the first illumination source and the second illumination source being configured to have substantially the same projection positions, the first illumination source supporting a first type of spatial pattern produced by the first light beam spot, and the second illumination source supporting a second type of spatial pattern produced by the second light beam spot:

receiving information for a target location, the target location identifying a location of an activity detected from video captured by a surveillance camera, the information being generated by the surveillance camera or by a server in communication with the surveillance camera from coordinates obtained by the surveillance camera of the location of the detected activity, and the coordinates including an estimate of a distance between the surveillance camera and the location of the detected activity;

receiving an indication of a type of detected activity taking place at the target location through a network connection, the indication being based on the video captured by the surveillance camera;

selecting, based on the received indication of the type of detected activity, a type of spatial pattern that is to be projected onto the target location, wherein the type of spatial pattern is selected from the first type of spatial pattern and the second type of spatial pattern, the first type of spatial pattern being configured to indicate monitoring by law enforcement or security personnel to deter or stop illegal or criminal activity at the target location, the second type of spatial pattern being different from the first type of spatial pattern by having characteristics of the first light beam be different from characteristics of the second light beam, and the second type of spatial pattern being configured to indicate to an injured person or someone in a desolate area that law enforcement or security personnel is monitoring the area and assistance is on its way or readily available;

adjusting the projection positions of the first illumination source and the second illumination source based on the received information for the target location; and projecting, after the projection positions of the first illumination source and the second illumination source are adjusted and the type of spatial pattern is selected, a light beam having the selected type of spatial pattern generated by the respective illumination source onto the target location.

\* \* \* \* \*